United States Patent
Hankendi et al.

(10) Patent No.: US 10,281,964 B2
(45) Date of Patent: May 7, 2019

(54) DETERMINING THERMAL TIME CONSTANTS OF PROCESSING SYSTEMS

(71) Applicant: Advanced Micro Devices, Inc., Sunnyvale, CA (US)

(72) Inventors: Can Hankendi, Sunnyvale, CA (US); Manish Arora, Sunnyvale, CA (US); Indrain Paul, Austin, TX (US); Wei Huang, Austin, TX (US); Srilatha Manne, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 338 days.

(21) Appl. No.: 15/010,965

(22) Filed: Jan. 29, 2016

(65) Prior Publication Data

US 2017/0220022 A1 Aug. 3, 2017

(51) Int. Cl.
*G06F 1/20* (2006.01)
*G06F 11/30* (2006.01)

(52) U.S. Cl.
CPC ............... *G06F 1/206* (2013.01); *G06F 1/20* (2013.01); *G06F 11/3058* (2013.01)

(58) Field of Classification Search
CPC .......... G05B 19/404; G05B 1/01; G05B 1/02; G05B 11/01; G05B 11/011; G05B 11/018; G05B 13/02; G05B 13/0205; G05B 13/0265; G05B 13/04; G05B 13/36; G05B 13/40; G05B 6/02; G06F 1/20; G06F 1/206; G06F 2217/80; G06F 11/3058
See application file for complete search history.

(56) References Cited

U.S. PATENT DOCUMENTS

| 6,302,509 B1 * | 10/2001 | Iwasaki | ................ B41J 2/04533 347/14 |
| 2003/0074591 A1 * | 4/2003 | McClendon | ............ G06F 1/206 713/322 |
| 2008/0170969 A1 * | 7/2008 | Yoshioka | .......... H01L 21/67109 422/109 |

(Continued)

OTHER PUBLICATIONS

Raghavan, Arun, et al. "Computational sprinting on a hardware/software testbed," In Proceedings of the eighteenth international conference on Architectural support for programming languages and operating systems (ASPLOS '13). Jan. 2013, ACM, New York, NY, USA, 155-166.

(Continued)

*Primary Examiner* — Eduardo A Rodela

(57) ABSTRACT

A processing system includes one or more processing units to perform operations and one or more sensors to measure a temperature concurrently with the one or more processing units performing the operations. The processing system also includes a controller to receive feedback indicating the temperature and to determine a peak temperature and a thermal time constant for heating of the processing system based on a comparison of the measured temperature to a first temperature that is predicted based on the peak temperature and a previously determined thermal time constant for heating. Some embodiments of the controller can control a performance state of the processing system based on the peak temperature and the thermal time constant for heating of the processing system.

21 Claims, 9 Drawing Sheets

(56) References Cited

U.S. PATENT DOCUMENTS

| | | | | |
|---|---|---|---|---|
| 2011/0055597 A1* | 3/2011 | Wyatt | ............... | G05B 13/0275 |
| | | | | 713/300 |
| 2013/0155793 A1* | 6/2013 | Schreiber | ............... | G11C 8/08 |
| | | | | 365/194 |
| 2015/0194969 A1* | 7/2015 | Kawabe | ............... | H03L 7/00 |
| | | | | 327/114 |
| 2015/0263190 A1* | 9/2015 | Knights | ............... | G02F 1/011 |
| | | | | 250/201.1 |

OTHER PUBLICATIONS

Raghavan, Arun, et al. "Computational sprinting," In Proceedings of the 2012 IEEE 18th International Symposium on High-Performance Computer Architecture (HPCA '12). Jan. 2012, IEEE Computer Society, Washington, DC, USA, 1-12.

Rote, Efraim, et al. "Power-Management Architecture of the Intel Microarchitecture Code-Named Sandy Bridge," IEEE Micro vol. 32, No. 2 (Mar. 2012), 20-27.

Nussabaum, Sebastien, "AMD Trinity APU," HotChips, Jan. 2012.

Huang, Wei, et al., "HotSpot: a compact thermal modeling methodology for early-stage VLSI design," Very Large Scale Integration (VLSI) Systems, IEEE Transactions on,vol. 14, No. 5, pp. 501-513, May 2006.

Paul, Indrani et al., "Cooperative Boosting: Needy Versus Greedy Power Management," IEEE International Symposium on Computer Architecture (ISCA), Jan. 2013.

Chen, Shyi-Meng, et al., "Temperature Prediction Using Fuzzy Times Series," IEEE Transactions on Systems, Man, and Cybernetics—Part B: Cybernetics, vol. 30, No. 2, Apr. 2000, pp. 263-275.

Kuang, Jilong, et al., "Predictive Model-Based Thermal Management for Network Applications," 2011 Seventh ACM/IEEE Symposium on Architectures for Networking and Communications Systems, Oct. 3-4, 2011, pp. 57-68.

\* cited by examiner

DETERMINING THERMAL TIME CONSTANTS OF PROCESSING SYSTEMS

BACKGROUND

Field of the Disclosure

The present disclosure relates generally to processing systems and, more particularly, to thermal properties of processing systems.

Description of the Related Art

A processing system, such as a system-on-a-chip (SOC), often incorporates multiple compute units onto a single substrate. A compute unit typically includes one or more processor cores that share resources such as a floating-point unit, one or more caches, branch predictors, a physical layer interface to external memory, and other front-end logic. For example, an accelerated processing unit (APU) may use a single substrate to support and interconnect multiple compute units such as central processing units (CPUs) or graphics processing units (GPUs). Some processing systems may also stack multiple substrates on top of each other and interconnect them using through silicon vias (TSVs). Operation of the components of the processing system generates heat, which raises the temperature of the processing system. The processing system is constrained to operate at temperatures within a thermal envelope that is typically indicated by a parameter referred to as "a temperature design power (TDP)". Operation at temperatures outside the thermal envelope (e.g., above a maximum temperature threshold) can damage the processing system.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
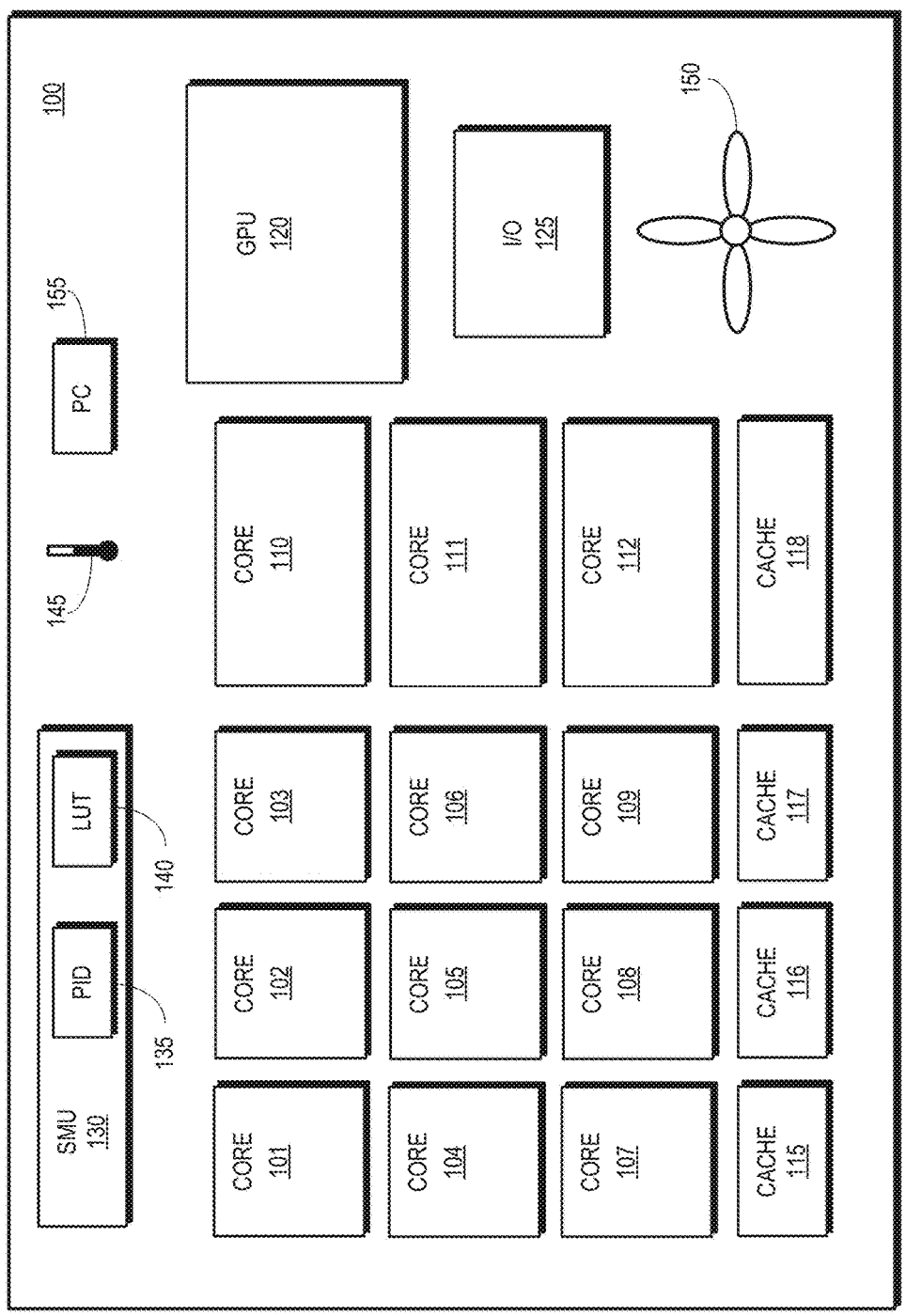
FIG. 1 is a block diagram of a processing system in accordance with some embodiments.

The time required to heat a processing system from an ambient temperature to a maximum temperature defined by the TDP of the processing system is represented by one or more thermal time constants such as a rise time constant to heat the processing system and a cooling time constant to cool the processing system. Thermal time constants are determined in part by static factors such as a power consumption profile of components of the processing system, layout of the components in the processing system, thermal conductivity in the processing system, a type or distribution of passive heat dissipation elements in the processing system, and the like. Thermal time constants also vary dynamically in response to changes in factors such as an overall workload of the processing system, numbers of memory accesses performed by the processing system, number of floating-point operations performed by the processing system, a speed of a fan used to dissipate heat in the processing system, and the like. Thus, the actual value of a thermal time constant can be difficult or impossible to predict prior to run time.

Values of the thermal time constants that characterize a processing system can be dynamically determined at run time by estimating a peak temperature based on power consumption rate and a heat dissipation rate of the processing system while performing one or more operations. The thermal time constant for heating the processing system is then determined by comparing a measured temperature of the processing system to a predicted temperature that is determined based on the peak temperature and a previously determined thermal time constant for heating. The thermal time constant for cooling the processing system may also be determined by comparing the measured temperature to a predicted temperature that is determined based on an ambient temperature and a previously determined thermal time constant for cooling. In some embodiments, a proportional-integral (PI) controller or a proportion-integral-derivative (PID) controller is used to determine the thermal time constants using feedback indicating a current value of the measured temperature of the processing system. The feedback may include information indicating performance characteristics of the processing system such as power consumption, a speed of a fan, temperatures measured by one or more sensors, values of performance counters, and the like. Initial estimates of the thermal time constants can be determined from a look up table (or other empirical relationship) that is generated by executing a set of benchmark applications (potentially on different platforms or processing systems) with different power consumption rates and measuring the peak temperature and thermal time constants for the benchmark applications. The initial estimates of the thermal time constants may be used as the previously determined thermal time constants for a first iteration of the determination process, after which the thermal time constants that were determined in the previous iteration are used as the previously determined thermal time constants.

In some embodiments, the estimated thermal time constants are used to determine durations of performance states of the processing system, such as high-performance, boosted states in which the operating voltage or frequency of the processing system is temporarily increased to improve performance. Boosting the operating state of a processing system for a finite period of time (which may be referred to as sprinting) increases the heating rate and, consequently, the temperature of the processing system. Limiting the duration of the sprint to a time interval that is less than the thermal time constant for heating of the processing system prevents the processing system from exceeding the maximum temperature set by the TDP. The thermal time constant for cooling of the processing system may be used to determine a time interval to allow the processing system to cool after a sprint time interval. A duty cycle for alternating sprinting and cooling time intervals can therefore be determined based upon the thermal time constant for heating and cooling.

FIG. 1 is a block diagram of a processing system 100 in accordance with some embodiments. The processing system 100 is a heterogeneous processing system that includes multiple processor cores 101, 102, 103, 104, 105, 106, 107, 108, 109, 110, 111, 112 (collectively referred to herein as "the processor cores 101-112") that can independently execute instructions concurrently or in parallel. In some embodiments, the processor cores 101-112 may be associated with one or more CPUs (not shown in FIG. 1). The processor cores 101-112 are associated with one or more caches 115, 116, 117, 118 that are collectively referred to herein as "the caches 115-118". Some embodiments of the caches 115-118 may include an L2 cache for caching instructions or data, one or more L1 caches, or other caches. Some embodiments of the caches 115-118 may be subdivided into an instruction cache and a data cache.

The processor cores 101-112 or the caches 115-118 may have different sizes. For example, the processor cores 101-109 may be smaller than the processor cores 110-112 and the caches 115-117 may be smaller than the cache 118. The size of a cache is typically determined by the number or length of lines in the cache. The size of a processor core may be determined by the instructions per cycle (IPCs) that can be performed by the processor core, the size of the instructions (e.g., single instructions versus very long instruction words, VLIWs), the size of caches 115-118 implemented in or associated with the processor cores 101-112, whether the processor core supports out-of-order instruction execution (larger) or in-order instruction execution (smaller), the depth of an instruction pipeline, the size of a prefetch engine, the size or quality of a branch predictor, whether the processor core is implemented using an x86 instruction set architecture (larger) or an ARM instruction set architecture (smaller), or other characteristics of the processor cores 101-112. The larger processor cores 110-112 may consume more area on the die and may consume more power relative to the smaller processor cores 101-109. The number or size of processor cores in the processing system 100 is a matter of design choice. Some embodiments of the processing system 100 may include more or fewer processor cores 101-112 and the processor cores 101-112 may have a different distribution of sizes.

A graphics processing unit (GPU) 120 is also included in the processing system 100 for creating visual images intended for output to a display, e.g., by rendering the images on a display at a frequency determined by a rendering rate. Some embodiments of the GPU 120 may include multiple cores, a video frame buffer, or cache elements that are not shown in FIG. 1 interest of clarity. In some embodiments, the GPU 120 may be larger than some or all of the processor cores 101-112. For example, the GPU 120 may be configured to process multiple instructions in parallel, which may lead to a larger GPU 120 that consumes more area and more power than some or all of the processor cores 101-112.

The processing system 100 includes an input/output (I/O) engine 125 for handling input or output operations associated with elements of the processing system such as keyboards, mice, printers, external disks, and the like.

The processor cores 101-112 and the GPU 120 can perform operations such as executing instructions from an application or a phase of an application. As used herein, the term "application phase" refers to a portion of an application that can be scheduled for execution on a component of the processing system 100 independently of scheduling other portions, or other application phases, of the application. The size of an application phase may range from a single instruction to all of the instructions in the application. An application phase may correspond to an application kernel, which refers to a particular portion of an application defined by the programmer, such as a function, a subroutine, a code block, and the like. Each application phase may run for a different duration, exhibit different mixes of active events and idle events, and have different computational intensities or be more or less memory bounded. Application phases may also have different thermal properties or characteristics. For example, different application phases may induce different thermal rise times in the processor cores 101-112 or the GPU 120, may have different thermal intensities, or may exhibit different thermal profiles when executed on the different processor cores 101-112 or the GPU 120, as discussed herein.

The processor cores 101-112 the GPU 120, the I/O engine 125 or other components in the processing system 100 may have different thermal densities or thermal sensitivities, which may affect or determine the thermal time constants associated with the processing system 100 such as a thermal time constant for heating of the processing system or a thermal time constant for cooling the processing system. As used herein, the term "thermal density" indicates the amount of power dissipated per unit area or the amount of heat dissipation per unit area at a location or by a component in the processing system 100. As used herein, the term "thermal sensitivity" indicates how sensitive the temperature at a particular location or in a particular component is to changes in the thermal density in a region proximate the location. For example, a region with a higher thermal sensitivity may rise to a higher temperature than a region with a lower thermal sensitivity when the two regions are exposed to the same thermal density. The thermal density or thermal sensitivity of a portion of the processing system 100 may depend on a variety of factors that may in turn interact with each other such as a power consumption rate, a heat dissipation rate, a thermal conductivity between the portions, and the like. The following discussion provides examples of factors that may affect the thermal density or thermal sensitivity but thermal densities or thermal sensitivities in some embodiments of the processing system 100 may be influenced by other factors or other combinations of factors or interactions between factors.

The thermal density or the thermal sensitivity of components such as the processor cores 101-112 or the GPU 120 may depend on the size of the processor cores 101-112 or the size of the GPU 120. For example, the thermal density or thermal sensitivity of the smaller processor cores 101-109 may be smaller (or larger) than the thermal density or thermal sensitivity of the larger processor cores 110-112. Some embodiments of the GPU 120 may be more thermally efficient and therefore have lower thermal densities or thermal sensitivities than other entities in the processing system 100 such as the processor cores 101-112. Thus, the GPU 120 may operate at a lower temperature than the processor cores 101-112 when the GPU 120 and the processor cores 101-112 are consuming the same amount of power.

The thermal density or the thermal sensitivity of components such as the processor cores 101-112 or the GPU 120 may also depend on the distribution or layout of the processor cores 101-112 or the GPU 120 in the processing system 100. In some embodiments, thermal sensitivity is larger in portions of the processing system 100 that include a larger density of circuits because changes in the power dissipated in higher density circuits can lead to more rapid changes in the local temperature. The thermal sensitivity may also be larger at the center of a substrate because circuits in the center of the substrate may not be as close to external heat sinks (if present) and therefore do not dissipate heat as efficiently as circuits near the edge of the substrate that are closer to the external heat sinks. For example, the thermal sensitivity of the processor core 105 may be larger than the thermal sensitivity of the processor core 101. Proximity to components that have a relatively low thermal density/sensitivity may also decrease the thermal density/sensitivity of a component. For example, the thermal sensitivity of the processor core 109 may be lower than the thermal sensitivity of the processor core 103 because the processor core 109 is near the cache 117, which has a lower thermal sensitivity. Stacking multiple substrates in a 3-dimensional configuration may also affect the thermal density and thermal sensitivity because heat can be efficiently conducted between the stacked substrates.

The workload or workloads being executed by the processor cores 101-112 or the GPU 120 can influence the thermal density or the thermal sensitivity of components such as the processor cores 101-112 or the GPU 120. For example, the thermal densities of a pair of adjacent components such as the processor cores 101-102 may be relatively high if they are independently processing two high-power workloads and there is no resource contention between the workloads being processed on the different compute units so the processor cores 101-102 are able to retire instructions at a high rate. The temperatures of the compute units may therefore increase while processing the high-power workloads due to the relatively high heat dissipation, potentially leading to thermal emergencies or thermal throttling of the workloads, e.g., by reducing the operating frequency or operating voltage. For another example, the thermal densities of the processor cores 101 and 109 may be relatively lower than the previous example even if they are independently processing the same two high-power workloads because the heat can be efficiently dissipated by other structures such as the cache 117, idle processor cores 102, 104, 105, or passive heat dissipation elements such as external heat sinks.

Computationally intensive or memory bounded workloads may have different effects on the thermal density or the thermal sensitivity of components such as the processor cores 101-112 or the GPU 120. For example, a processor core 101 that is executing a computationally intensive application phase may retire a relatively large number of instructions per cycle and may therefore dissipate a larger amount of heat. The processor core 101 may therefore exhibit a high thermal density or thermal sensitivity. For another example, an application phase that is memory bounded may exhibit relatively short active periods interspersed with relatively long idle periods and may therefore dissipate a smaller amount of heat. A processor core running the memory bounded application phase may therefore exhibit a low thermal density or thermal sensitivity.

The performance state of the processing system (or components thereof) may influence the thermal density or the thermal sensitivity of the processor cores 101-112 or the GPU 120. For example, the thermal density or thermal sensitivity of the processor core 101 may be higher than the thermal density or thermal sensitivity of the processor core 102 if the processor core 101 is operating at a higher voltage or frequency than the processor core 102. For another example, the thermal density or thermal sensitivity of the processor core 101 may increase (or decrease) in response to a change in the performance state that causes the operating voltage or frequency of the processor core 101 to increase (or decrease). Some embodiments of the processor cores 101-112 or the GPU 120 may operate in one of a predetermined set of performance states. For example, the different performance states may be labeled P0-P7, where higher numbers indicate higher operating points that correspond to higher operating voltages or frequencies.

Some embodiments of the processing system 100 may implement a system management unit (SMU) 130 that may be used to carry out policies set by an operating system (not shown in FIG. 1) of the processing system 100. The operating system may be implemented using one or more of the processor cores 101-112. Some embodiments of the SMU 130 may be used to manage thermal and power conditions in the processing system 100 according to policies set by the operating system and using information that may be provided to the SMU 130 by the operating system, such as a thermal history associated with an application being executed by one of the components of the processing system 100, thermal sensitivities of the components, and a layout of the components in the processing system 100, as discussed herein. The SMU 130 may therefore be able to control a performance state of the processing system 100. Some embodiments of the SMU 130 control the performance state by controlling power supplied to entities such as the processor cores 101-112 or the GPU 120, as well as adjusting operating points of the processor cores 101-112 or the GPU 120, e.g., by changing an operating frequency or an operating voltage supplied to the processor cores 101-112 or the GPU 120. For example, the SMU 130 may determine duty cycles for boosting or sprinting by alternately operating the processor cores 101-112 or the GPU 120 at higher and lower performance states depending on the values of thermal time constants of the processing system 100, as discussed herein. The SMU 130 or portions thereof may therefore be referred to as a power management unit in some embodiments.

Some embodiments of the SMU 130 may include a controller, such as a proportional-integral (PI) controller or a proportional-integral-derivative (PID) controller 135. The SMU 130 also includes a look up table (LUT) 140 that can be used to determine initial values of a peak temperature of the processing system 100, a thermal time constant for heating of the processing system 100, or a thermal time constant for cooling of the processing system 100. The LUT 140 may be configured using benchmarking applications, as discussed herein. Although the PID controller 135 and the LUT 140 are implemented in the SMU 130 in FIG. 1, some embodiments may implement this functionality at different locations within the processing system 100.

The PID controller 135 dynamically modifies values of the peak temperature or the thermal time constants by reducing an error between one or more measured temperature values and one or more temperature values predicted based on previously determined values of the peak temperature and the thermal time constants. Some embodiments of the PID controller 135 dynamically modify the values based on performance characteristics of the processing system 100 that are fed back to the PID controller 135 concurrently with the processing system 100 (or components thereof) performing one or more operations. The performance characteristics may be determined using other elements of the processing system such as one or more temperature sensors 145, one or more fans (or other active or passive cooling elements) 150, one or more performance counters 155, and the like. Some embodiments of the PID controller 135 receive feedback indicating power consumption of the processing system 100 (or individual components thereof), one or more temperatures measured by the temperature sensors 145, a speed of the fan 150, values of the performance counters 155, and the like. For example, the PID controller 135 may determine the peak temperature and a thermal time constant for heating of the processing system 100 based on a comparison of the temperature measured by the one or more temperature sensors 145 to a first temperature that is predicted based on the peak temperature and the thermal time constant for heating estimated during a previous iteration of the PID controller 135 (or an initial value of the thermal time constant for heating determined using the LUT), as discussed herein.

Figure 2:
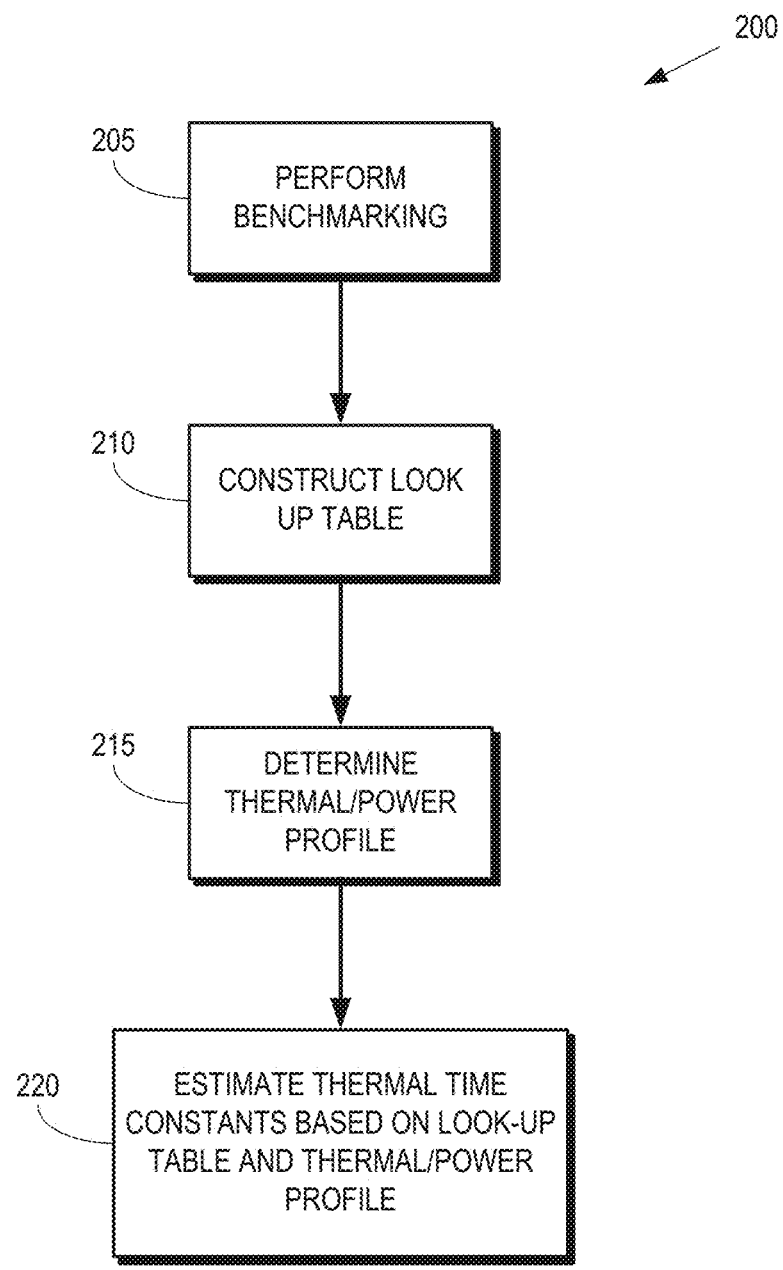
FIG. 2 is a flow diagram of a method for determining initial values of thermal time constants for a processing system based on benchmarks for a predetermined set of applications or platforms according to some embodiments.

FIG. 2 is a flow diagram of a method 200 for determining initial values of thermal time constants based on benchmarks for a predetermined set of applications or platforms according to some embodiments. The method 200 may be implemented in a controller such as some embodiments of the SMU 130 shown in FIG. 1. At block 205, benchmarking is performed to determine peak temperatures and thermal time constants for the predetermined set of applications. The predetermined set of applications may be selected to have a range of power consumption rates that substantially covers an expected range of power consumption rates for other applications. For example, the predetermined set of applications may have a range of power consumption rates from 60 watts to 100 watts in equal intervals (such as 5 watt intervals) that depend on the number of applications in the predetermined set. In some embodiments, the applications are run on a single platform and temperature profiles are recorded using temperature sensors implemented in the processing system. The applications may also be run on multiple platforms to establish a wider range of benchmarks that are applicable across different platforms.

At block 210, a look up table is constructed based on the temperature profiles. Some embodiments of the look up table indicate values of the peak temperature, the thermal time constant for heating, and the thermal time constant for cooling for each application (or corresponding power consumption rate) and each platform (if multiple platforms are benchmarked). For example, the peak temperature and the thermal time constants for each application/platform may be defined by a model equation that defines the peak temperature ($T_{ss}$) and the thermal time constant for heating ($\beta$):

$$T(t)=T_{ss}-(T_{ss}-T_{init})*e^{-\beta t} \quad (1)$$

and a model equation that defines the thermal time constant for cooling ($\alpha$):

$$T(t)=T_{am}+(T_{init}-T_{am})*e^{-\alpha t} \quad (2)$$

where $T_{am}$ is the ambient temperature and $T_{init}$ is the initial temperature of the processing system. The values of the peak temperature and the thermal constants may be determined by fitting equations (1) and (2) to the thermal profiles measured during the benchmarking process. The initial values of the model parameters reflect static factors such as thermal conductivity and layout of the processing system, e.g., on the surface of a chip.

At block 215, the controller determines a thermal profile or a power profile of an application that is going to be executed by the processing system. For example, the controller may access information indicating an expected power consumption rate for the application.

At block 220, the controller estimates the peak temperature and the thermal time constants by comparing the thermal/power profile of the application to values in a look up table such as the LUT 140 shown in FIG. 1. For example, if the thermal/power profile of the application indicates that the expected power consumption rate for the application is 75 watts, the peak temperature and the thermal time constants can be estimated by interpolating between benchmark values in the look up table for applications that have a power consumption rate of 70 watts and applications that have a power consumption rate of 80 watts. The peak temperature and the thermal time constants may also be estimated based on a comparison of the platform that is executing the application and the platforms that are used in the benchmark process.

Figure 3:
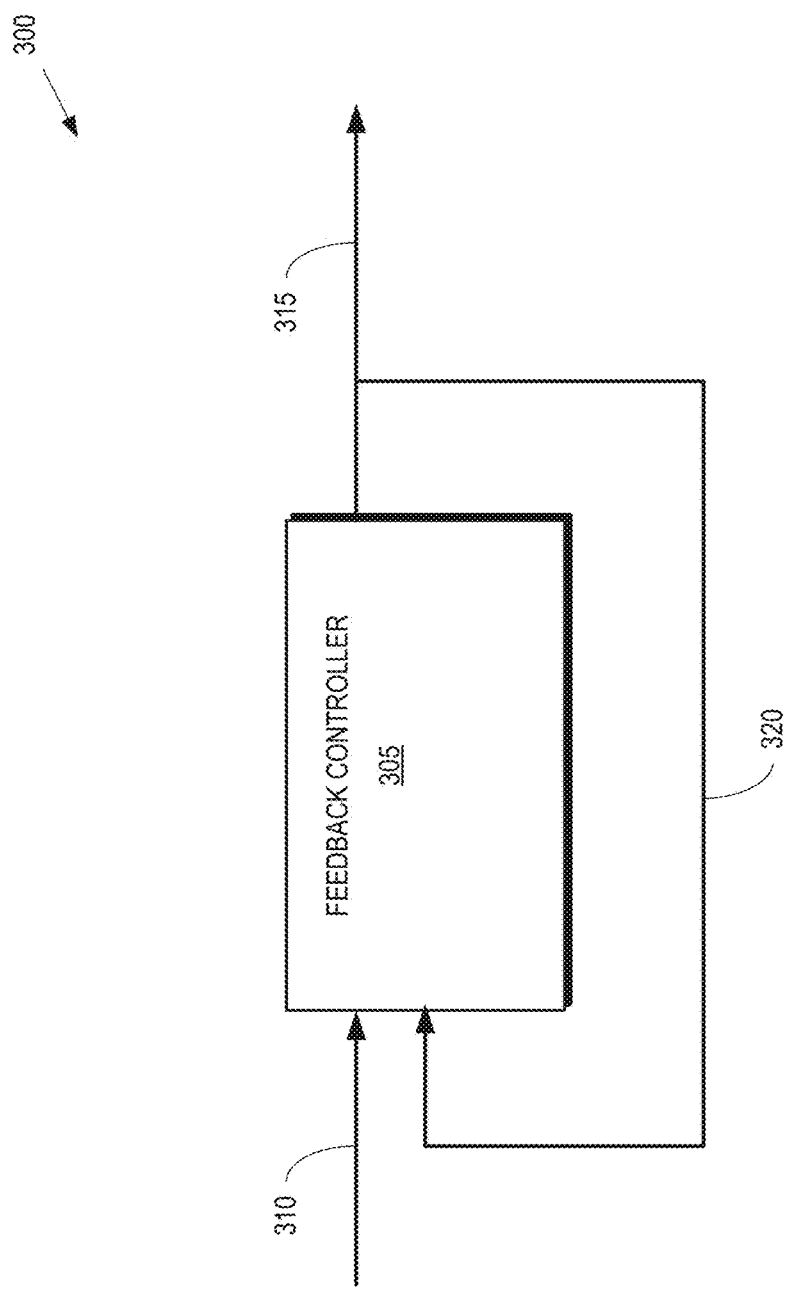
FIG. 3 is a block diagram of a portion of a processing system that includes a feedback controller for determining thermal time constants at run-time according to some embodiments.

FIG. 3 is a block diagram of a portion 300 of a processing system that includes a feedback controller 305 for determining thermal time constants at run-time according to some embodiments. The feedback controller 305 may be used to implement some embodiments of the controller 135 shown in FIG. 1. The feedback controller 305 may therefore be a closed-loop feedback controller such as a PI controller or a PID controller. At run-time, the feedback controller 305 receives input signals 310 indicative of performance characteristics of the processing system. The performance characteristics may include power readings indicating power consumption rates for one or more components of the processing system such as processor cores, caches, GPUs, I/O devices, and the like. The performance characteristics may also include signals indicative of a speed of a fan used to cool the processing system, temperatures measured at one or more locations in the processing system, and the like.

The feedback controller 305 also generates output signals 315 indicative of thermal time constants of the processing system. Some embodiments of the feedback controller 305 generate output signals 315 indicative of peak temperatures, thermal time constants for heating, and thermal time constants for cooling of the processing system. For example, the feedback controller 305 may generate initial values of the peak temperature and the thermal time constants using a look up table, as discussed herein. The feedback controller 305 may also dynamically modify the values of the peak temperature and the thermal time constants using a portion of the output signal 315 that is provided as a feedback signal 320 to form the closed-loop to the feedback controller 305. The feedback portion of the output signal 315 is representative of the previously determined values of the model parameters. For example, the feedback controller 305 may use proportional-integral or proportional-integral-derivative techniques to modify the values of the peak temperature and the thermal time constants based on errors between temperatures predicted based on the previously determined values of the model parameters (e.g., using equations (1) and (2)) and temperatures measured in the processing system at different times. Some embodiments of the closed-loop feedback controller 305 modify the parameter values in response to changing values of the input signals 310.

Figure 4:
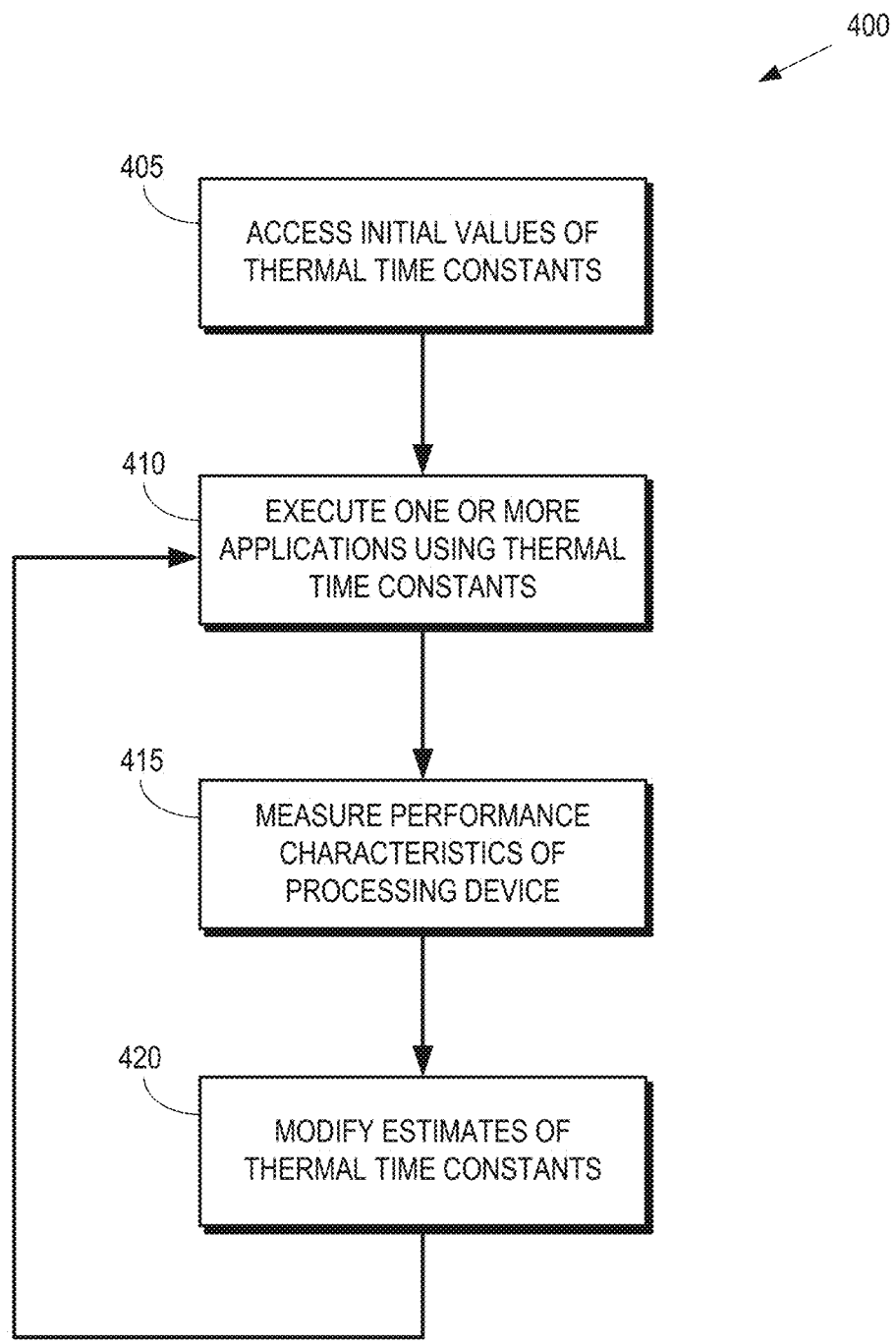
FIG. 4 is a flow diagram of a method for modifying estimates of thermal time constants for a processing system at run-time using closed-loop feedback control according to some embodiments.

FIG. 4 is a flow diagram of a method 400 for modifying estimates of thermal time constants for a processing system at run-time using closed-loop feedback control according to some embodiments. The method 400 may be implemented in some embodiments of the processing system 100 shown in FIG. 1 or the feedback controller 305 shown in FIG. 3. At block 405, the controller accesses initial values of thermal time constants. For example, the controller may determine initial values of the thermal time constants using static factors such as a power consumption profile of components of the processing system, layout of the components in the processing system, thermal conductivity in the processing system, a type or distribution of passive heat dissipation elements in the processing system, and the like to estimate a thermal or power profile of the processing system. The thermal power profile may then be used to estimate the thermal time constants based on benchmark values, which may be stored in a look up table such as the LUT 140 shown in FIG. 1.

At block 410, the processing system executes instructions in one or more applications. Some embodiments of the processing system may use the initial values of the thermal time constants to set execution parameters such as a duty cycle for cycling between high and low performance states of processor cores in the processing system, as discussed herein. Executing the instructions may generate heat that changes the temperature of the processing system.

At block 415, one or more performance characteristics of the processing system are measured. The measured performance characteristics may include power consumption by one or more components of the processing system, a speed of a fan implemented in the processing system, temperatures measured by one or more sensors implemented in the processing system, values of performance counters, an overall workload of the processing system, numbers of memory accesses performed by the processing system, number of floating-point operations performed by the processing system, and the like. The measured value of the performance characteristics are then provided as input to the controller.

At block 420, the controller modifies the estimated values of the thermal time constants (and, in some cases, peak temperatures) based on the measured values of the performance characteristics. The controller may also modify the estimated values of the thermal time constants or the peak temperatures based on feedback indicating previous values of the thermal time constants or the peak temperatures, e.g., using PI or PID techniques. The modified estimates of the thermal time constants or the peak temperatures may then be fed back to the controller. The method 400 then flows back to block 410 so that the controller can continue to dynamically modify the estimates of the thermal time constants or the peak temperatures concurrently with execution of instructions in the one or more applications or in response to changes in the measured performance characteristics of the processing system.

Figure 5:
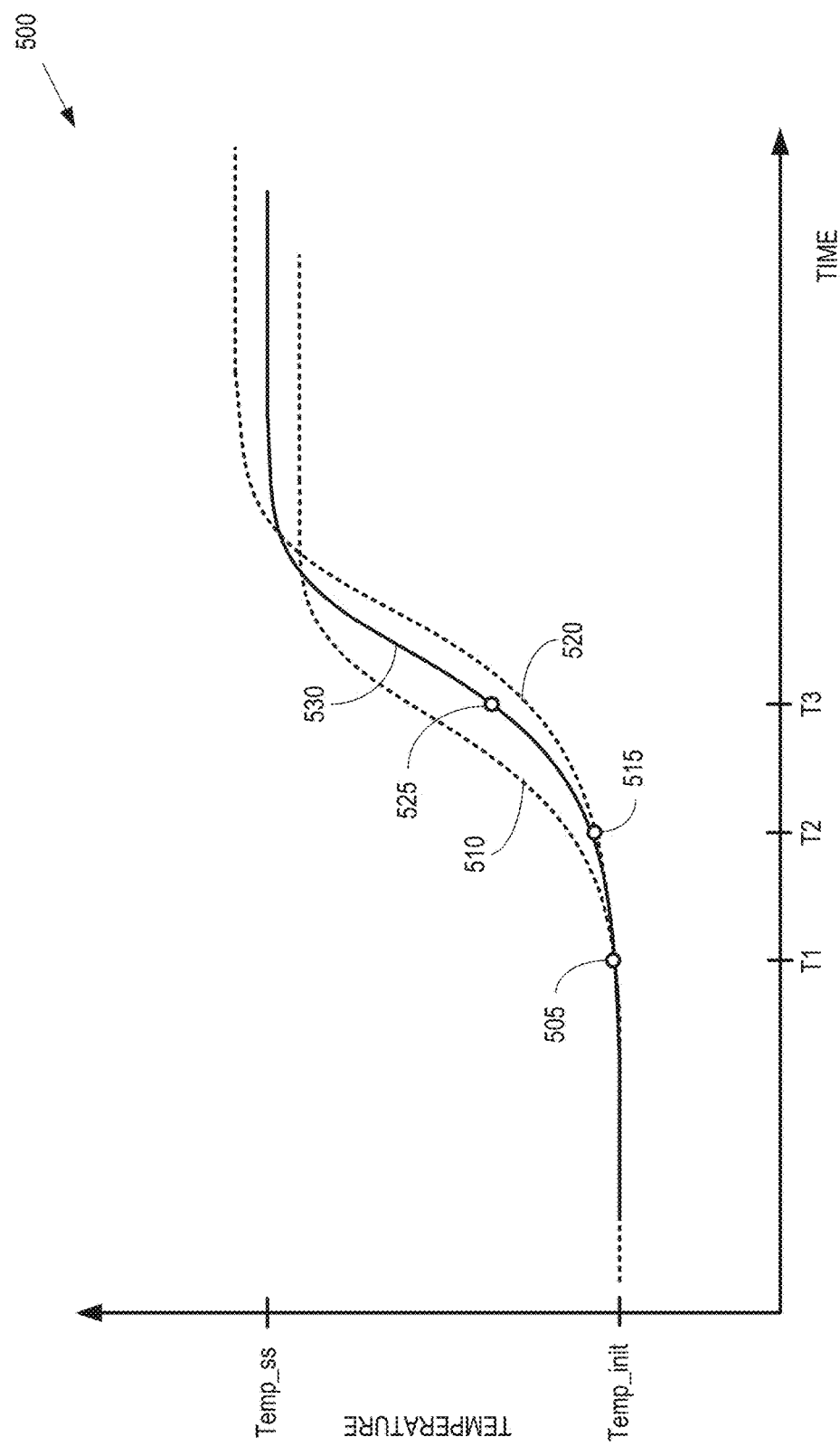
FIG. 5 is a plot of measured temperatures and predicted temperatures for different estimated values of a peak temperature and a thermal time constant for heating of a processing system according to some embodiments.

FIG. 5 is a plot 500 of measured temperatures and predicted temperatures for different estimated values of a peak temperature and a thermal time constant for heating of a processing system according to some embodiments. The vertical axis indicates temperature in arbitrary units and the horizontal axis indicates time in arbitrary units increasing from left to right. The plot 500 may indicate the measured temperatures of some embodiments of the processing system 100 shown in FIG. 1 and predicted temperatures for model parameters estimated by a controller such as the controller 135 shown in FIG. 1. The temperature model used to predict the temperature of the processing system based on the model parameters may be represented by equation (1).

At T<T1, substantially no heating has occurred, e.g., because the processing system is not in an active state or executing instructions associated with any applications. Thus, the temperature of the processing system is at an initial value (Temp_init). The controller has accessed initial values of the peak temperature and thermal time constant for heating that are determined based on static factors associated with the processing system. For example, the controller may have determined the initial values using a look up table of benchmarked values, as discussed herein.

At T=T1, the processing system begins executing instructions for one or more applications. One or more sensors in the processing system also measure a temperature 505 of the processing system, which may be slightly higher than the initial value (Temp_init). The measured temperature 505 is provided to the controller, which estimates the peak temperature and thermal time constant for heating based on the measured temperature 505 (and any other measured performance characteristics) and the initial values of the peak temperature and the thermal time constant. The estimated values correspond to the predicted temperature curve 510 that is determined based on equation (1). The estimated values are also fed back to the controller.

At T=T2, the processing system continues executing instructions for the one or more applications. The sensors in the processing system measure a temperature 515 of the processing system, which may be slightly higher than the temperature 505 due to additional heating caused by execution of the instructions by the processing system. The measured temperature 515 is provided to the controller, which modifies the estimated values of the peak temperature and thermal time constant for heating based on the measured temperature (and any other measured performance characteristics) and the feedback information indicating the previously determined values of the peak temperature and the thermal time constant. For example, the feedback controller may modify the estimated values based on an error between the measured temperature 515 and a temperature predicted by the temperature curve 510 at the time T2. The modified values correspond to the predicted temperature curve 520 that is determined based on equation (1).

At T=T3, the processing system continues executing instructions for the one or more applications. The sensors in the processing system measure a temperature 525 of the processing system, which may be slightly higher than the temperature 515 due to additional heating caused by execution of the instructions by the processing system. The measured temperature 525 is provided to the controller, which modifies the estimated values of the peak temperature and thermal time constant for heating based on the measured temperature (and any other measured performance characteristics) and the feedback information indicating the previously determined values of the peak temperature and the thermal time constant. For example, the feedback controller may modify the estimated values based on an error between the measured temperature 525 and a temperature predicted by the temperature curve 520 at the time T3. The modified values correspond to the predicted temperature curve 530 that is determined based on equation (1).

At T>T3, the processing system may continue to execute instructions for the one or more applications. The controller may therefore continue to perform closed-loop feedback control to modify the values of the peak temperature and the thermal time constant for heating based on measured values of performance characteristics and feedback information indicating the previously determined values of the peak temperature and the thermal time constant.

Figure 6:
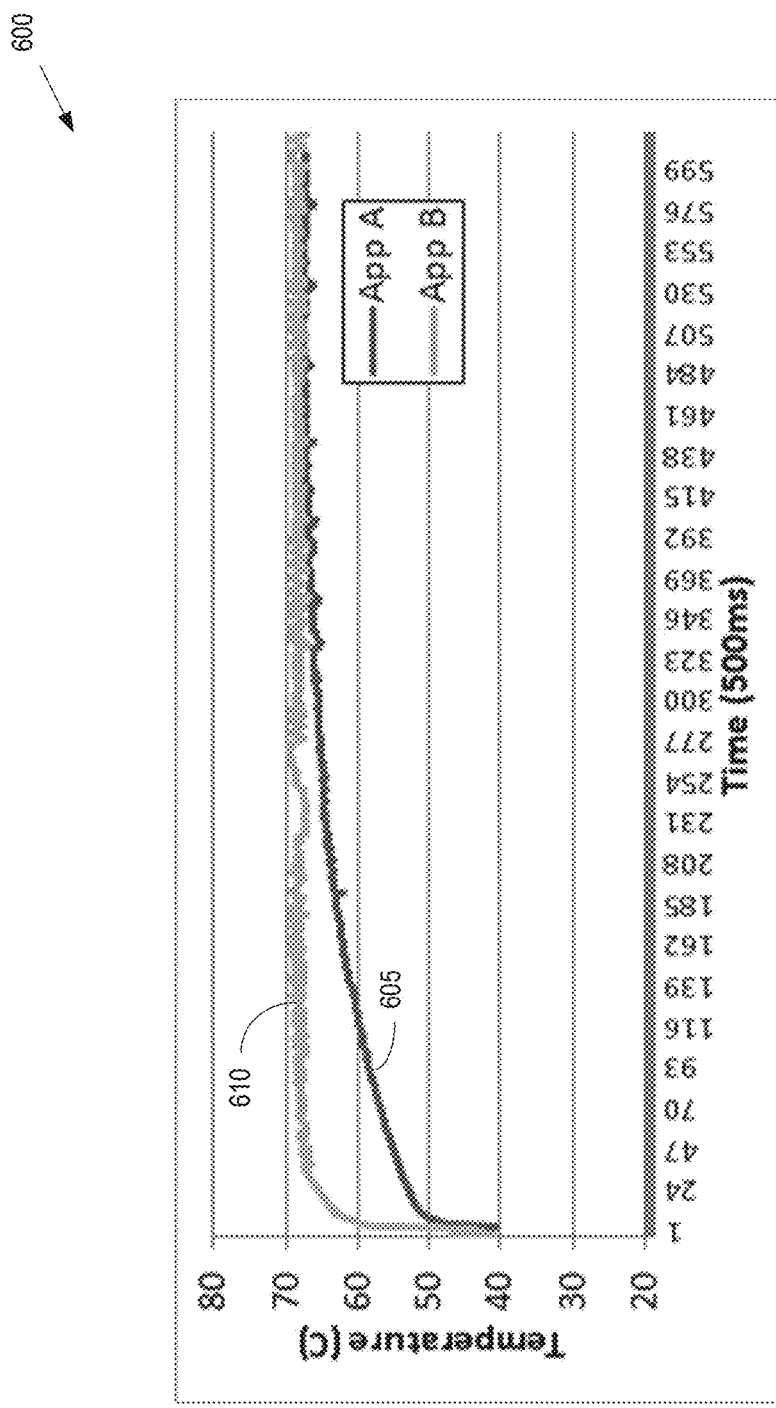
FIG. 6 is a plot indicating temperatures of a processing system while executing different applications according to some embodiments.

FIG. 6 is a plot 600 indicating temperatures of a processing system while executing different applications according to some embodiments. The first application (App A) has a thermal time constant for heating of 3.5 seconds, which is longer than the thermal time constant for heating of 44 seconds for the second application (App B). The processing system is constrained to operate at temperatures below a maximum temperature of 70° C. Due to the difference between the thermal time constants for heating, the processing system rises to the maximum temperature at different rates when executing the first and second applications. For example, the processing system follows the temperature curve 605 and rises to the maximum temperature within approximately 500 milliseconds (ms) when executing the first application. The processing system follows the temperature curve 610 and rises to the maximum temperature within approximately 50 ms when executing the second application. The processing system may throttle the first or second application to prevent the temperature of the processing system from exceeding the maximum temperature. For example, the processing system may change the operating point of the processing system by reducing an operating frequency or an operating voltage of one or more components of the processing system in response to the temperature reaching the maximum temperature.

Figure 7:
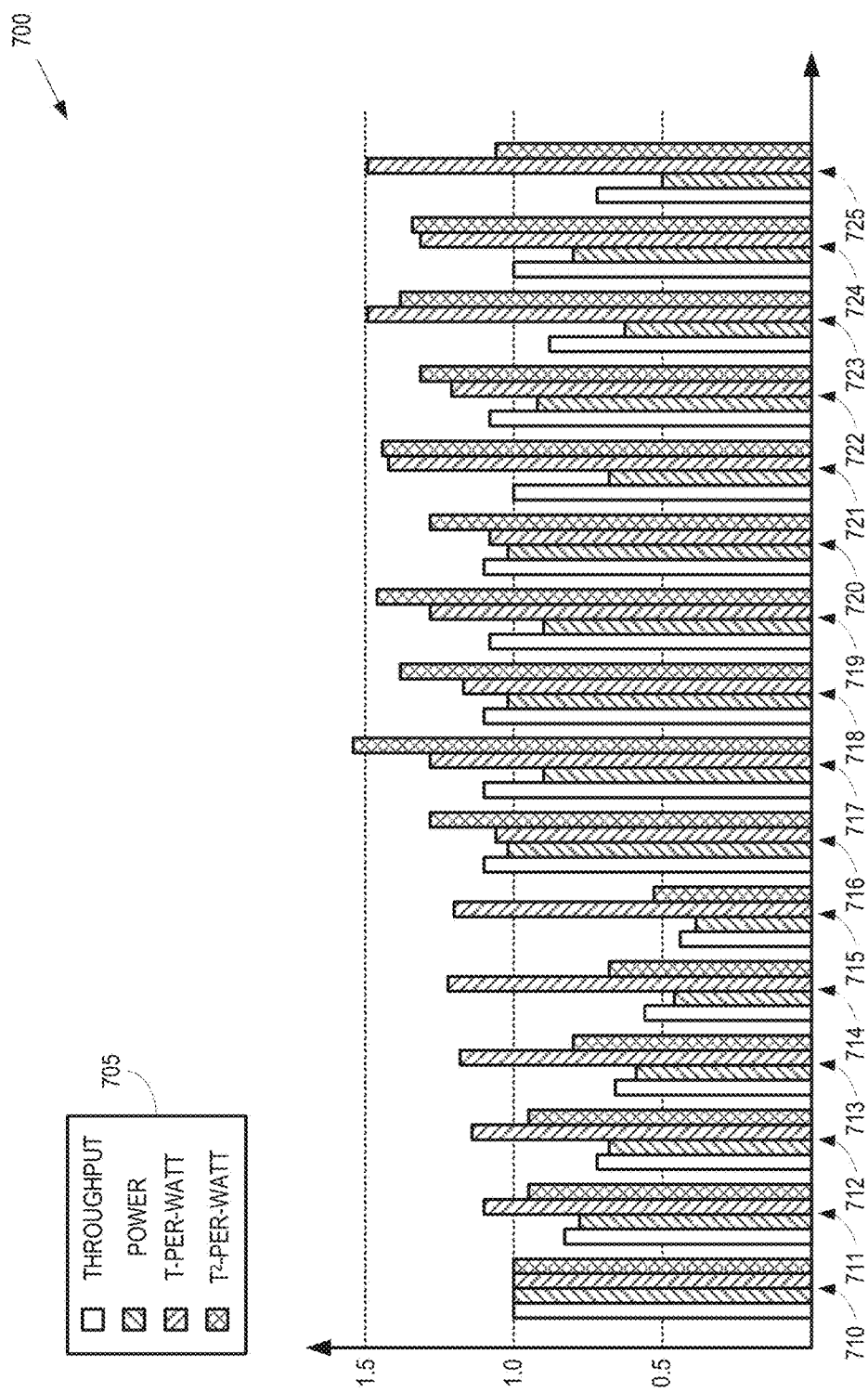
FIG. 7 is a bar chart that compares performance, power, and energy efficiency of different performance states and combinations of performance states of a processing system according to some embodiments.

FIG. 7 is a bar chart 700 that compares performance, power, and energy efficiency of different performance states and combinations of performance states of a processing system according to some embodiments. The bar chart 700 may illustrate properties of a processing system such as the processing system 100 shown in FIG. 1. The bar chart 700 illustrates the throughput, the power consumption (e.g., in watts), the throughput-per-watt, and the throughput-squared-per-watt for the performance states and combinations of performance states depicted in FIG. 7. The throughput, the power consumption (e.g., in watts), the throughput-per-watt, and the throughput-squared-per-watt may be referred to as the "performance parameters." The legend 705 indicates the hatching associated with the different performance parameters.

The processing system operates in different performance states that are defined by an operating point such as an operating frequency or an operating voltage. In some embodiments, the performance states are indicated by P0, P1, P2, P3, P4, P5, P6, and P7, where the larger values are higher performance states in which the processing system (or a component of the processing system) operates at higher frequencies or voltages. A performance state may also include switching between two or more of the performance states. For example, a performance state may include switching between the P0 state and the P3 state every 10 ms. The number of performance states and the operating frequency/voltage associated with each of the performance states is a matter of design choice. The bar chart 700 shows sets 710, 711, 712, 713, 714, 715, 716, 717, 718, 719, 720, 721, 722, 723, 724, and 725 (collectively referred to as "the sets 710-725") that indicate the values of the performance parameters for different performance states.

The set 710 indicates the throughput, power consumption, throughput-per-watt, and the throughput-squared-per-watt for a boosted performance state in which the processing system is switched between a relatively low performance state P0 and a relatively higher performance state P3 using an algorithm that does not consider the thermal time constants associated with the processing system. The performance parameters are normalized to the values determined for the set 710 so the normalized values of the throughput, power consumption, throughput-per-watt, and the throughput-squared-per-watt in the bar chart 700 are 1.0 for the set 710.

The set 711 indicates the performance parameters when the performance state of the processing system is fixed in the P3 state. The normalized throughput-per-watt increases (relative to the boosted performance state) and the throughput, power, and throughput-squared-per-watt decrease (relative to the boosted performance state).

The set 712 indicates the performance parameters when the performance state of the processing system is fixed in the P4 state. The normalized throughput-per-watt increases relative to the set 711. The throughput and power decrease relative to the set 711 and the throughput-squared-per-watt remains approximately constant relative to the set 711.

The set 713 indicates the performance parameters when the performance state of the processing system is fixed in the P5 state. The normalized throughput-per-watt remains approximately constant relative to the set 712. The throughput, power, and throughput-squared-per-watt decrease relative to the set 712.

The set 714 indicates the performance parameters when the performance state of the processing system is fixed in the P6 state. The normalized throughput-per-watt increases relative to the set 713. The throughput, power, and throughput-squared-per-watt decrease relative to the set 713.

The set 715 indicates the performance parameters when the performance state of the processing system is fixed in the P7 state. The throughput, power, throughput-per-watt, and throughput-squared-per-watt decrease relative to the set 714.

The set 716 indicates the performance parameters for a performance state in which the processing system has a duty cycle in which the processing system is in the P0 state for 50 ms and in the P3 state for 10 ms during each cycle. The throughput, power, throughput-per-watt, and throughput-squared-per-watt increase relative to the set 710 for the boosted performance state.

The set 717 indicates the performance parameters for a performance state in which the processing system has a duty cycle in which the processing system is in the P0 state for 10 ms and in the P3 state for 10 ms during each cycle. The throughput and power decrease relative to the set 716. The throughput-per-watt and throughput-squared-per-watt increase relative to the set 716. Thus, the "sprinting" mechanism that switches between the P0 and P3 states in a 50%-50% duty cycle having a duration of 20 ms improves the energy efficiency of the processing system by 53% in comparison to the boosted performance state.

The set 718 indicates the performance parameters for a performance state in which the processing system has a duty cycle in which the processing system is in the P0 state for 50 ms and in the P4 state for 10 ms during each cycle. The throughput remains approximately constant and the power increases relative to the set 717. The throughput-per-watt and throughput-squared-per-watt decrease relative to the set 717.

The set 719 indicates the performance parameters for a performance state in which the processing system has a duty cycle in which the processing system is in the P0 state for 10 ms and in the P4 state for 10 ms during each cycle. The throughput and the power decrease relative to the set 718. The throughput-per-watt and throughput-squared-per-watt increase relative to the set 718.

The set 720 indicates the performance parameters for a performance state in which the processing system has a duty cycle in which the processing system is in the P0 state for 50 ms and in the P5 state for 10 ms during each cycle. The throughput remains approximately constant and the power increases relative to the set 719. The throughput-per-watt and throughput-squared-per-watt decrease relative to the set 719.

The set 721 indicates the performance parameters for a performance state in which the processing system has a duty cycle in which the processing system is in the P0 state for 10 ms and in the P5 state for 10 ms during each cycle. The throughput and the power decrease relative to the set 720. The throughput-per-watt and throughput-squared-per-watt increase relative to the set 720.

The set 722 indicates the performance parameters for a performance state in which the processing system has a duty cycle in which the processing system is in the P0 state for 50 ms and in the P6 state for 10 ms during each cycle. The throughput and the power increase relative to the set 721. The throughput-per-watt and throughput-squared-per-watt decrease relative to the set 721.

The set 723 indicates the performance parameters for a performance state in which the processing system has a duty cycle in which the processing system is in the P0 state for 10 ms and in the P6 state for 10 ms during each cycle. The throughput and the power decrease relative to the set 722. The throughput-per-watt increases and throughput-squared-per-watt remains approximately constant relative to the set 722.

The set 724 indicates the performance parameters for a performance state in which the processing system has a duty cycle in which the processing system is in the P0 state for 50 ms and in the P7 state for 10 ms during each cycle. The throughput and the power increase relative to the set 723. The throughput-per-watt and throughput-squared-per-watt decrease relative to the set 723.

The set 725 indicates the performance parameters for a performance state in which the processing system has a duty cycle in which the processing system is in the P0 state for 10 ms and in the P7 state for 10 ms during each cycle. The throughput and the power decrease relative to the set 724. The throughput-per-watt increases and the throughput-squared-per-watt decreases relative to the set 724.

Figure 8:
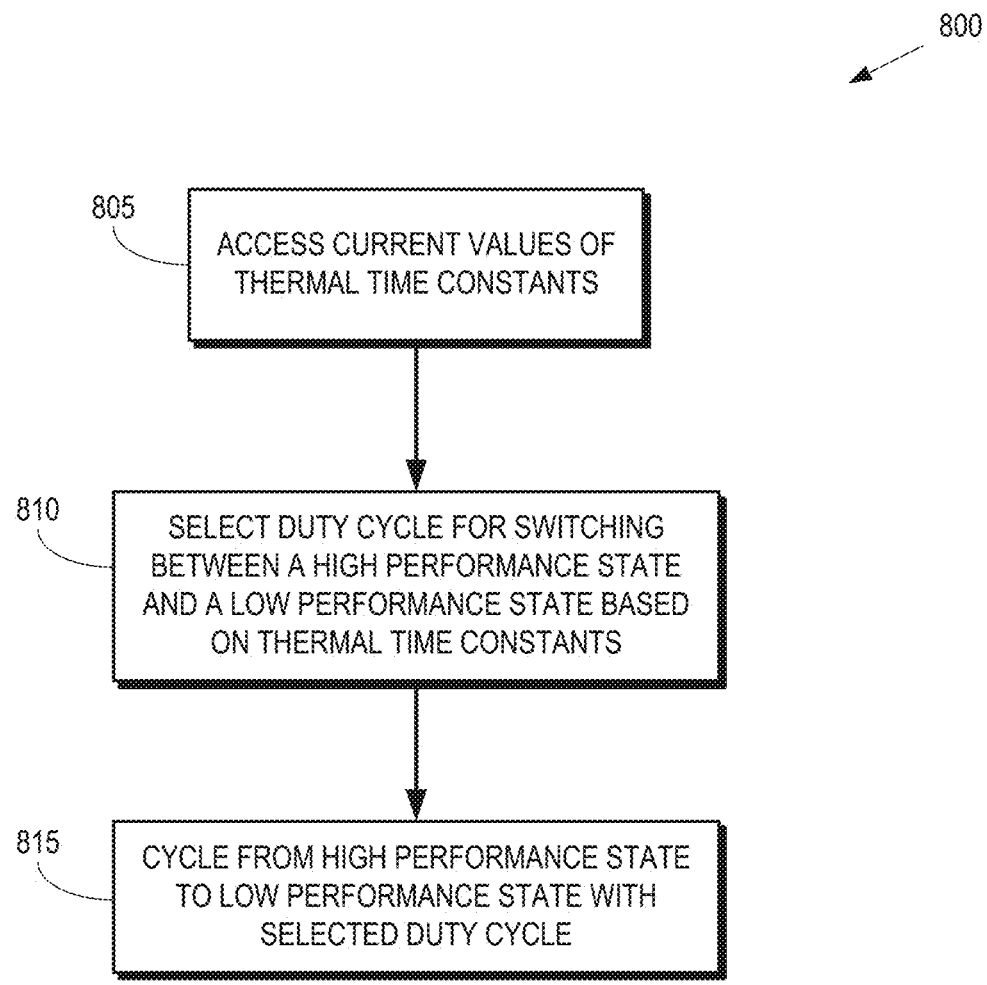
FIG. 8 is a flow diagram of a method for selectively boosting a processing system (or components thereof) based on thermal time constants of the processing system according to some embodiments.

FIG. 8 is a flow diagram of a method 800 for selectively boosting a processing system (or components thereof) based on thermal time constants of the processing system according to some embodiments. The method 800 may be implemented in some embodiments of the processing system 100 shown in FIG. 1. For example, a controller such as the SMU 130 shown in FIG. 1 may be used to selectively boost the processing system 100 (or components thereof) according to embodiments of the method 800. At block 805, the controller accesses current values of the thermal time constants for the processing system. The current values of the thermal time constants may be determined according to embodiments of the techniques disclosed herein, such as embodiments of the method 400 shown in FIG. 4. Some embodiments of the controller may access the current values of the thermal time constants in response to modifications of the values of the thermal time constants so that the controller uses the most up-to-date values of the dynamically determined thermal time constants.

At block 810, the controller selects a duty cycle for switching between a high performance state and a low performance state of the processing system (or components thereof) based on the thermal time constants. Some embodiments of the processing system set a time interval for boosting or sprinting (i.e., operating the processing system in a high performance state determined by an increased operating frequency or voltage) to be less than or equal to the thermal time constant for heating. For example, if the thermal time constant for heating of a processing system is 50 ms, the controller may configure the processing system (or components thereof) to operate in the high performance state for a time interval that is less than or equal to 50 ms. Some embodiments of the processing system set a subsequent time interval for operating the processing system in a relatively low performance state to be greater than or equal to the thermal time constant for cooling to allow the processing system time to cool off after sprinting or boosting. For example, if the thermal time constant for cooling of the processing system is 10 ms, the controller may set the time interval for operating in the low performance state to be greater than or equal to 10 ms.

At block 815, the processing system (or components thereof) cycle between the high performance state of the low performance state following the duty cycle selected by the controller. For example, the time interval for boosting or sprinting may be set to 20 ms so that this time interval is less than a thermal time constant of 50 ms. The duty cycle may be set to 50% so that the time interval for operating in the low performance state is also 20 ms, which is greater than a thermal time constant for cooling of 10 ms. The processing system (or components thereof) may therefore cycle between a 20 ms boost/sprint time interval and a 20 ms cooling interval at the low performance state. Although the method 800 is described in the context of a processing system that can cycle between two different performance states, some embodiments of the method 800 may also be applied to processing systems that can cycle between more than two performance states.

Figure 9:
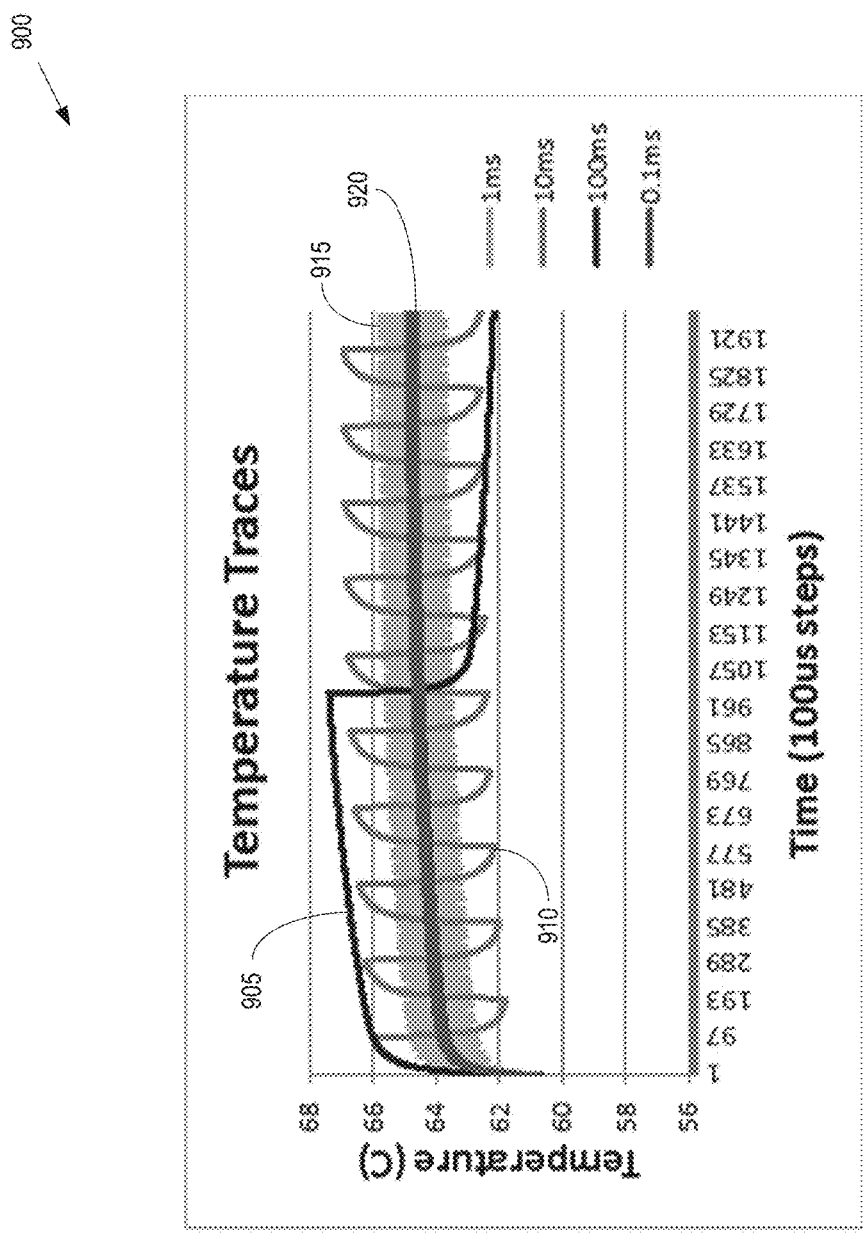
FIG. 9 is a plot illustrating temperatures of a processing system as a function of a duration of a sprinting or boosting time interval according to some embodiments.

FIG. 9 is a plot 900 illustrating temperatures of a processing system as a function of a duration of a sprinting or boosting time interval according to some embodiments. The vertical axis indicates temperature in degrees Celsius and the horizontal axis indicates time in 100 microsecond steps increasing from left to right. The duty cycle for sprinting or boosting is 50% for all of the temperature traces 905, 910, 915, 920 so that the boosted (high-performance) time interval is equal to the cooling (low performance) time interval. The processing system has a power consumption rate of 40 watts in the high performance state and a power consumption rate of 10 watts in the low performance state.

The temperature trace 905 illustrates the temperature as a function of time when the processing system sprints for a time interval of 100 ms. The temperature trace 905 shows that the processing system reaches a peak temperature of 67.3° C. The temperature trace 910 illustrates the temperature as a function of time when the spring time interval is 10 ms. The peak temperature of the temperature trace 910 is lower than the peak temperature of the temperature trace 905 due to the shorter time interval for heating of the processing system. The temperature trace 915 illustrates the temperature as a function of time when the spring time interval is 1 ms. The peak temperature of the temperature trace 915 is lower than the peak temperature of the temperature trace 910 due to the shorter time interval for heating of the processing system. The temperature trace 920 illustrates the temperature as a function of time when the spring time interval is 0.1 ms. The peak temperature of the temperature trace 920 is 64.9° C., which is lower than the peak temperature of the temperature trace 915 due to the shorter time interval for heating of the processing system.

In some embodiments, the apparatus and techniques described above are implemented in a system comprising one or more integrated circuit (IC) devices (also referred to as integrated circuit packages or microchips), such as the processing system described above with reference to FIGS. 1-8. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   receiving, at a controller of a processing system comprising one or more processor cores, feedback indicating a first temperature of the processing system measured concurrently with the processing system performing at least one operation; and
   controlling, at the controller, a performance state of the processing system based on a peak temperature, a first thermal time constant for heating of the processing system and a first thermal time constant for cooling the processing system, wherein the first thermal time constant for heating is determined based on a comparison of the first temperature to a second temperature that is predicted based on the peak temperature and a second thermal time constant for heating, wherein the second thermal time constant for heating is a previously determined thermal time constant for heating and wherein controlling the performance state comprises changing one or more of an operating frequency or an operating voltage of the one or more processor cores.

2. The method of claim 1, further comprising:
   determining the first thermal time constant for cooling the processing system based on a comparison of the first temperature to a third temperature that is predicted based on an ambient temperature and a previously determined thermal time constant for cooling.

3. The method of claim 2, further comprising:
   estimating initial values of the peak temperature and the first thermal time constant for heating and the first thermal time constant for cooling of the processing system based on a power consumption rate and a heat dissipation rate of the processing system; and
   using the estimated initial value of the first thermal time constant for heating as the previously determined thermal time constant for heating and using the estimated initial value of the first thermal time constant for cooling as the previously determined thermal time constant for cooling.

4. The method of claim 3, wherein estimating the initial values comprises estimating the initial values by based on the power consumption rate, the heat dissipation rate, and a look up table that includes values of the peak temperature and the first thermal time constant for heating and the first thermal time constant for cooling corresponding to a predetermined set of power consumption rates and heat dissipation rates associated with a plurality of applications having different power profiles and thermal profiles.

5. The method of claim 4, wherein receiving the feedback comprises receiving feedback indicating at least one of a power consumption rate of the processing system, a speed of a fan in the processing system, temperatures measured by one or more sensors in the processing system, and at least one value of at least one performance counter in the processing system.

6. The method of claim 5, wherein the controller is at least one of a proportional-integral controller and a proportional-integral-derivative controller, and wherein determining the peak temperature and the first thermal time constant for heating and the first thermal time constant for cooling of the processing system comprises modifying the peak temperature and the first thermal time constant for heating and the first thermal time constant for cooling in response to receiving the feedback.

7. The method of claim 1, wherein controlling the performance state of the processing system comprises determining a duty cycle for transitioning between a high performance state of the processing system and a low performance state of the processing system based on the first thermal time constant for heating.

8. An apparatus comprising:
    at least one processor core of a system-on-a-chip to perform at least one operation;
    a sensor to measure a first temperature concurrently with the at least one processor core performing the at least one operation; and
    a controller to receive feedback indicating the first temperature and determine a peak temperature and a first thermal time constant for heating of the apparatus based on a comparison of the first temperature to a second temperature that is predicted based on the peak temperature and a second thermal time constant for heating, wherein the second thermal time constant for heating is a previously determined thermal time constant for heating and to change one or more of an operating frequency or an operating voltage of the processor core based on the peak temperature, the first thermal time constant for heating and a first thermal time constant for cooling the apparatus.

9. The apparatus of claim 8, wherein the controller is to determine the first thermal time constant for cooling the apparatus based on a comparison of the first temperature to a third temperature that is predicted based on an ambient temperature and a previously determined thermal time constant for cooling.

10. The apparatus of claim 9, wherein the controller is to:
    estimate initial values of the peak temperature and the first thermal time constant for heating and the first thermal time constant for cooling of the apparatus based on a power consumption rate and a heat dissipation rate of the apparatus; and
    use the estimated initial value of the first thermal time constant for heating as the previously determined thermal time constant for heating and use the estimated initial value of the first thermal time constant for cooling as the previously determined thermal time constant for cooling.

11. The apparatus of claim 10, wherein the controller is to estimate the initial values based on the power consumption rate, the heat dissipation rate, and a look up table that includes values of the peak temperature and the first thermal time constant for heating and the first thermal time constant for cooling corresponding to a predetermined set of power consumption rates and heat dissipation rates associated with a plurality of applications having different power profiles and thermal profiles.

12. The apparatus of claim 9, further comprising:
    a fan;
    at least one performance counter; and
    wherein the controller is to receive feedback indicating at least one of a power consumption rate of the apparatus, a speed of the fan, and at least one value of the at least one performance counter.

13. The apparatus of claim 12, wherein the controller is at least one of a proportional-integral controller and a proportional-integral-derivative controller, and wherein determining the peak temperature and the first thermal time constant for heating and the first thermal time constant for cooling comprises modifying the peak temperature and the first thermal time constant for heating and the first thermal time constant for cooling in response to receiving the feedback.

14. The apparatus of claim 8, further comprising:
    a system management unit to control a performance state of the processor core.

15. The apparatus of claim 14, wherein the system management unit is to determine a duty cycle for transitioning between a high performance state of the at least one processor core and a low performance state of the at least one processor core based on the first thermal time constant for heating.

16. A non-transitory computer readable storage medium embodying a set of executable instructions, the set of executable instructions to manipulate a processor to:
    receive feedback indicating a first temperature of a processing system comprising one or more processor cores measured concurrently with the processing system performing at least one operation; and
    control a performance state of the processing system based on a peak temperature, a first thermal time constant for heating of the processing system and a first thermal time constant for cooling the processing system, wherein the first thermal time constant for heating is determined based on a comparison of the first temperature to a second temperature that is predicted based on the peak temperature and a second thermal time constant for heating, wherein the second thermal time constant for heating is a previously determined thermal time constant for heating, and wherein controlling the performance state comprises changing one or more of an operating frequency or an operating voltage of one or more of the processor cores.

17. The non-transitory computer readable storage medium set forth in claim 16, wherein the set of executable instructions manipulate the processor to determine the first thermal time constant for cooling the processing system based on a comparison of the first temperature to a third temperature that is predicted based on an ambient temperature and a previously determined thermal time constant for cooling.

18. The non-transitory computer readable storage medium set forth in claim 17, wherein the set of executable instructions manipulate the processor to estimate initial values of the peak temperature and the first thermal time constant for heating and the first thermal time constant for cooling of the processing system based on a power consumption rate and a heat dissipation rate of the processing system.

19. The non-transitory computer readable storage medium set forth in claim 18, wherein the set of executable instructions manipulate the processor to estimate the initial values by based on the power consumption rate, the heat dissipation rate, and a look up table that includes values of the peak temperature and the first thermal time constant for heating and the first thermal time constant for cooling corresponding to a predetermined set of power consumption rates and heat dissipation rates associated with a plurality of applications having different power profiles and thermal profiles.

20. The non-transitory computer readable storage medium set forth in claim 17, wherein the set of executable instructions manipulate the processor to receive feedback indicating at least one of a power consumption rate of the processing system, a speed of a fan in the processing system, temperatures measured by one or more sensors in the processing system, and at least one value of at least one performance counter in the processing system, and wherein the processor is to modify the peak temperature and the first thermal time constant for heating and the first thermal time constant for cooling in response to receiving the feedback.

21. The non-transitory computer readable storage medium set forth in claim 17, wherein the set of executable instructions manipulate the processor to determine a duty cycle for transitioning between a high performance state of at least one of the one or more processor cores and a low performance state of at least one of the one or more processor cores based on at least one of the first thermal time constant for heating and the first thermal time constant for cooling.

* * * * *